United States Patent
Adelaide et al.

(10) Patent No.: US 6,907,076 B2
(45) Date of Patent: Jun. 14, 2005

(54) METHOD OF SIMULTANEOUS FORMAT REDUCTION AND DECODING OF ENCODED VIDEO SIGNALS

(75) Inventors: Joseph Adelaide, Montigny le Bretonneux (FR); Robin Didier, Meudon la Foret (FR); Olivier Elbaz, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 543 days.

(21) Appl. No.: 10/104,912

(22) Filed: Mar. 22, 2002

(65) Prior Publication Data
US 2003/0035475 A1 Feb. 20, 2003
(Under 37 CFR 1.47)

(30) Foreign Application Priority Data
Mar. 27, 2001 (FR) .......................................... 01 04112

(51) Int. Cl.[7] .......................... H04N 7/12; H04N 11/02; H04N 11/04
(52) U.S. Cl. .............................. 375/240.2; 375/240.21; 348/385.1
(58) Field of Search ...................... 375/240.2, 240.21, 375/240.24; 348/385.1; 725/41, 56

(56) References Cited

U.S. PATENT DOCUMENTS

| | | | |
|---|---|---|---|
| 5,047,858 A | * 9/1991 | Aimonoya | 348/218.1 |
| 5,633,683 A | 5/1997 | Rosengren et al. | 348/385 |
| H001684 H | * 10/1997 | de Queiroz et al. | 382/233 |
| 5,900,868 A | * 5/1999 | Duhault et al. | 725/42 |
| 5,956,081 A | * 9/1999 | Katz et al. | 348/163 |
| 6,041,068 A | * 3/2000 | Rosengren et al. | 370/538 |
| 6,147,714 A | * 11/2000 | Terasawa et al. | 348/564 |
| 6,295,646 B1 | * 9/2001 | Goldschmidt Iki et al. | 725/41 |
| 6,476,823 B1 | * 11/2002 | Gardner | 345/661 |
| 6,493,038 B1 | * 12/2002 | Singh et al. | 348/565 |
| 6,549,245 B1 | * 4/2003 | Lee et al. | 348/700 |
| 6,741,617 B2 | * 5/2004 | Rosengren et al. | 370/536 |
| 6,748,018 B2 | * 6/2004 | Sato et al. | 375/240.21 |
| 6,784,945 B2 | * 8/2004 | Norsworthy et al. | 348/731 |

* cited by examiner

*Primary Examiner*—Chris Kelley
*Assistant Examiner*—Charles Parsons

(57) ABSTRACT

The invention relates to a method of video processing applied to N encoded video input signals, for decoding and reducing by a factor N the format of said encoded video input signals, and for generating a set of decoded video signals in the pixel domain, each encoded video input signal comprising DCT blocs. The method according to the invention is characterized in that it comprises a first and second inverse DCT step, each inverse DCT step being applied simultaneously on a plurality of DCT blocs of reduced size extracted from said N encoded video input signals. Thus are generated N output blocs of reduced size defining one of said decoded video signal of reduced format by a factor N.

Figure 1:
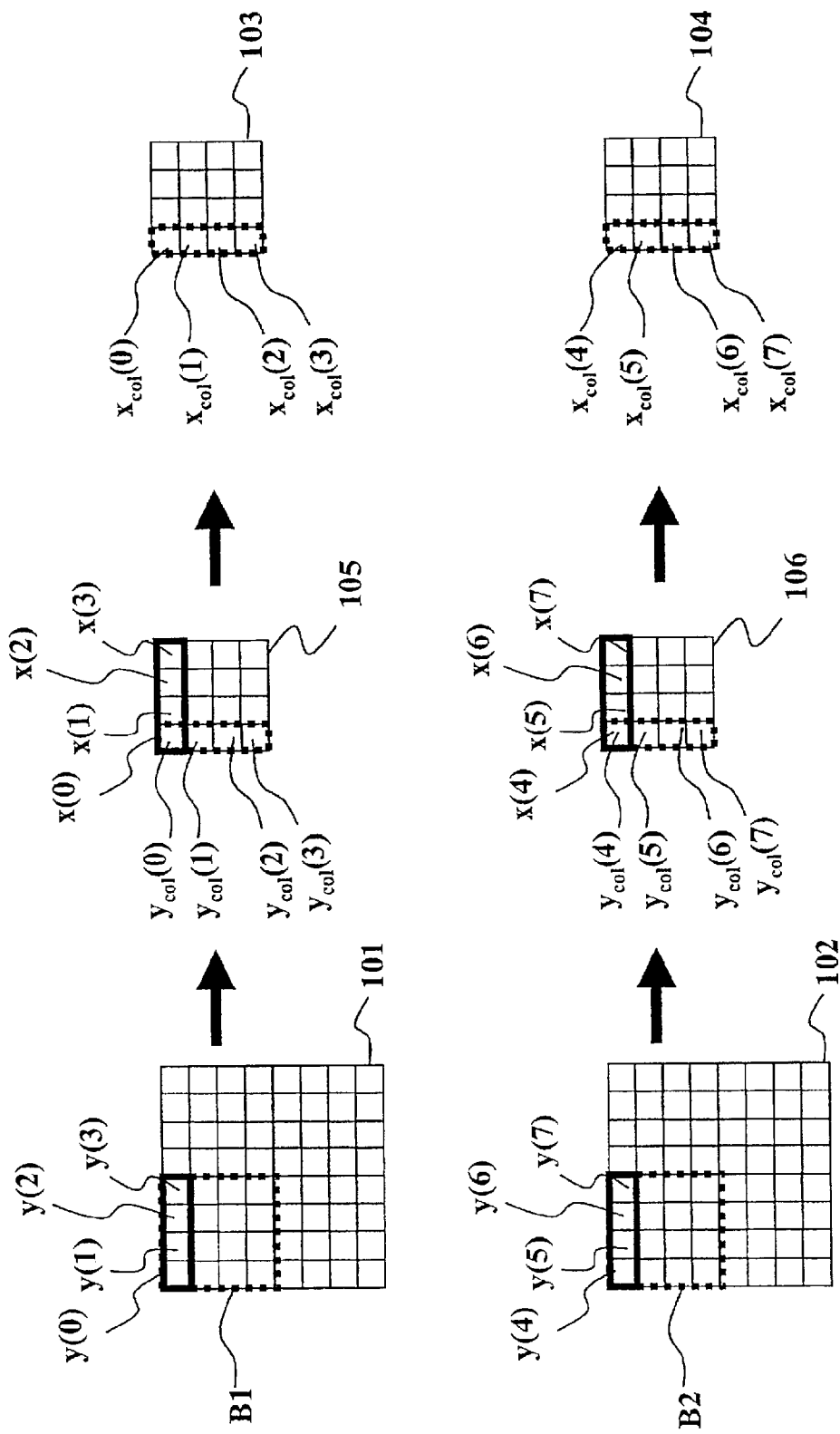

This invention can advantageously be used for the composition of mosaic video signals from a set of encoded signals.

12 Claims, 2 Drawing Sheets

METHOD OF SIMULTANEOUS FORMAT REDUCTION AND DECODING OF ENCODED VIDEO SIGNALS

The invention relates to a method of video processing N encoded video input signals for decoding and reducing the format of each encoded video input signal by a factor N and generating a set of decoded video signals of a reduced format in the pixel domain, each encoded video input signal comprising DCT blocks having a size of 8*8, referred to as "DCT input blocks".

With the advent of digital television, the number of TV programs a user can visualize on his television set has increased considerably. To cope with this increase of TV programs and to enable the user to choose from this collection of TV programs, a representation referred to as "mosaic" has been created, consisting of a juxtaposition of these previously reduced TV programs on the user's television screen. The user can thus simultaneously see the contents of a collection of TV programs, which will help him to select a particular TV program.

U.S. Pat. No. 5,633,683 describes a system for creating, at the level of a service provider, a mosaic video signal from a set of video signals encoded in accordance with the MPEG2 standard, said video signals resulting from the MPEG2 encoding of a collection of, for example, TV programs. To this end, each encoded video signal is decoded by means of a video decoder. The format of each encoded video signal is also reduced. The decoded video signals having the reduced format are subsequently concatenated in a memory for generating said mosaic video signal, the latter being then encoded in accordance with the MPEG2 standard before its transmission through a communication channel.

The method of creating a video signal representing a mosaic described in the prior-art document has a certain number of limitations.

First of all, the solution described in the prior art proposes the use of a parallel architecture in which each encoded video signal is separately decoded by an appropriate decoder. This has the drawback that the decoding means must be multiplied to the extent that there should be as many decoders as encoded video signals to be decoded, which leads to a costly system.

On the other hand, only the images of the INTRA type, i.e. images for which no motion compensation is effected, are decoded. This has the drawback that a video signal is generated which has a reduced video frequency which is unfavorable from a visual point of view when the mosaic is displayed on a screen.

Moreover, during decoding of images of the INTRA type, only the DC component of the DCT blocks in the encoded video signals are subjected to an inverse DCT transform (DCT=Discrete Cosine Transform), which means that the other DCT coefficients of a higher frequency in said DCT blocks are not taken into account, which is detrimental to the visual quality because the visual details of the decoded signal having a reduced format are thus suppressed.

It is an object of the invention to remedy these limitations to a large extent by proposing a video processing method for generating, in an economical manner, a set of decoded video signals having a reduced format and a better quality from a set of encoded video signals in accordance with a DCT block-encoding method.

To this end, the method of video processing N encoded video input signals according to the invention is characterized in that it comprises the steps of:

extracting N blocks having a reduced size (8/N*8/N), each block having a reduced size being extracted from a DCT input block, a first inverse DCT transform applied successively to input vectors having a size of 8, each input vector being replaced by coefficients of rows (or columns) constituting the N blocks having a reduced size, each inverse DCT transform step generating an output vector having a size of 8 defining the rows (or the columns) of the N intermediate blocks having a reduced size, said first inverse DCT transform step being repeated for all the rows (or the columns) of the N reduced-size blocks, a second inverse DCT transform applied successively to input vectors having a size of 8, each input vector being replaced by coefficients of columns (or rows) constituting the N intermediate blocks, each inverse DCT transform step generating an output vector having a size of 8 defining, via a recursive computing step applied to the values of said output vector, the columns (or the rows) of N output blocks having a reduced size, said second inverse DCT transform step being repeated for all the columns (or the rows) of the N intermediate blocks, each of said N reduced-size output blocks defining one of said decoded video signals having a format reduced by a factor N.

By using the method only for a limited set of DCT coefficients in each DCT input block, it is possible to decode and reduce the format of several encoded video signals in one and the same operation, which reduces the costs of material implementation of such a method, in contrast to the prior-art solution.

In accordance with a supplementary characteristic feature, the method according to the invention is characterized in that the extraction step effects the extraction of DCT coefficients of a lower frequency in each DCT input block.

A better quality of the video signals having a reduced format can thereby be obtained because the visual details defined by the non-zero frequency coefficients are partly preserved.

In accordance with a supplementary characteristic feature, the method according to the invention is characterized in that the first and the second inverse DCT transform step use a transform matrix having a size of 8*8 whose coefficient value is a function of the value of the parameter N.

The format of the encoded video input signals can thus be reduced by a simple change of the coefficients of the transform matrix. This allows great flexibility of the implementation of this method because a matrix computation is performed with a matrix of the same 8*8 size.

The invention also relates to a video processing method for decoding and reducing the format of an encoded video input signal by a factor N and for generating a decoded video signal of the reduced format in the pixel domain, said encoded video input signal comprising DCT blocks having a size of 8*8, referred to as "DCT input blocks". This method is characterized in that it comprises the steps of:

extracting N blocks having a reduced size (8/N*8/N), each block having a reduced size being extracted from a DCT input block, a first inverse DCT transform applied successively to input vectors having a size of 8, each input vector being replaced by coefficients of rows (or columns) constituting the N blocks having a reduced size, each inverse DCT transform step generating an output vector having a size of 8 defining the rows (or the columns) of the N intermediate blocks having a reduced size, said first inverse DCT transform step being repeated for all the rows (or the columns) of the N reduced-size blocks, a second inverse DCT transform applied successively to input vectors having a size of 8, each input vector being replaced by coefficients of columns (or rows) constituting the N intermediate blocks, each inverse DCT transform step generating an output vector having a size of 8 defining, via a recursive computing step applied to the values of said output vector, the columns (or the rows) of N output blocks having a reduced size, said second inverse DCT transform set being repeated for all the columns (or the rows) of the N intermediate blocks, said output blocks having a reduced size defining said decoded video signal having a format reduced by a factor N.

This method has the advantage of reducing the format of a single encoded video signal by minimizing the processing steps because several DCT input blocks are processed simultaneously.

The invention also relates to a method of creating a program mosaic from a set of $2^N$ encoded video input signals comprising DCT blocks having a size of 8*8 pixels, referred to as "DCT input blocks", said mosaic consisting of a juxtaposition of decoded video programs having a format reduced by a factor N, obtained from said encoded video input signals. This method is characterized in that it comprises, for each sub-set of ($2^N$/N) encoded video input signals, the steps of extracting N blocks having a reduced size (8/N*8/N), each block having a reduced size being extracted from a DCT input block associated with the sub-set under consideration, a first inverse DCT transform applied successively to input vectors having a size of 8, each input vector being replaced by coefficients of rows (or columns) constituting the N blocks having a reduced size, each inverse DCT transform step generating an output vector having a size of 8 defining the rows (or the columns) of the N intermediate blocks having a reduced size, said first inverse DCT transform step being repeated for all the rows (or the columns) of the N reduced-size blocks, a second inverse DCT transform applied successively to input vectors having a size of 8, each input vector being replaced by coefficients of columns (or rows) constituting the N intermediate blocks, each inverse DCT transform step generating an output vector having a size of 8 defining, via a recursive computing step applied to the values of said output vector, the columns (or the rows) of N output blocks having a reduced size, said second inverse DCT transform step being repeated for all the columns (or the rows) of the N intermediate blocks, in each sub-set, each of said N output blocks having a reduced size defining one of said decoded video signals having a format reduced by a factor N.

The invention also relates to a system of video processing N encoded video input signals. This video processing system is characterized in that it uses one or the other method as described above.

The invention also relates to a system of creating a program mosaic from a set of $2^N$ encoded video input signals. This system of creating a program mosaic is characterized in that it uses the method of creating a program mosaic as described above.

The invention also relates to a computer program comprising program code instructions for executing the different steps of the one or the other video processing method as described above, when said program is performed on a signal processor in a video processing system.

The invention also relates to a computer program comprising program code instructions for executing the different steps of the method of creating a mosaic as described above, when said program is performed on a signal processor in a system for creating a program mosaic.

These and other aspects of the invention are apparent from and will be elucidated, by way of non-limitative example, with reference to the embodiments described hereinafter.

Figure 2:
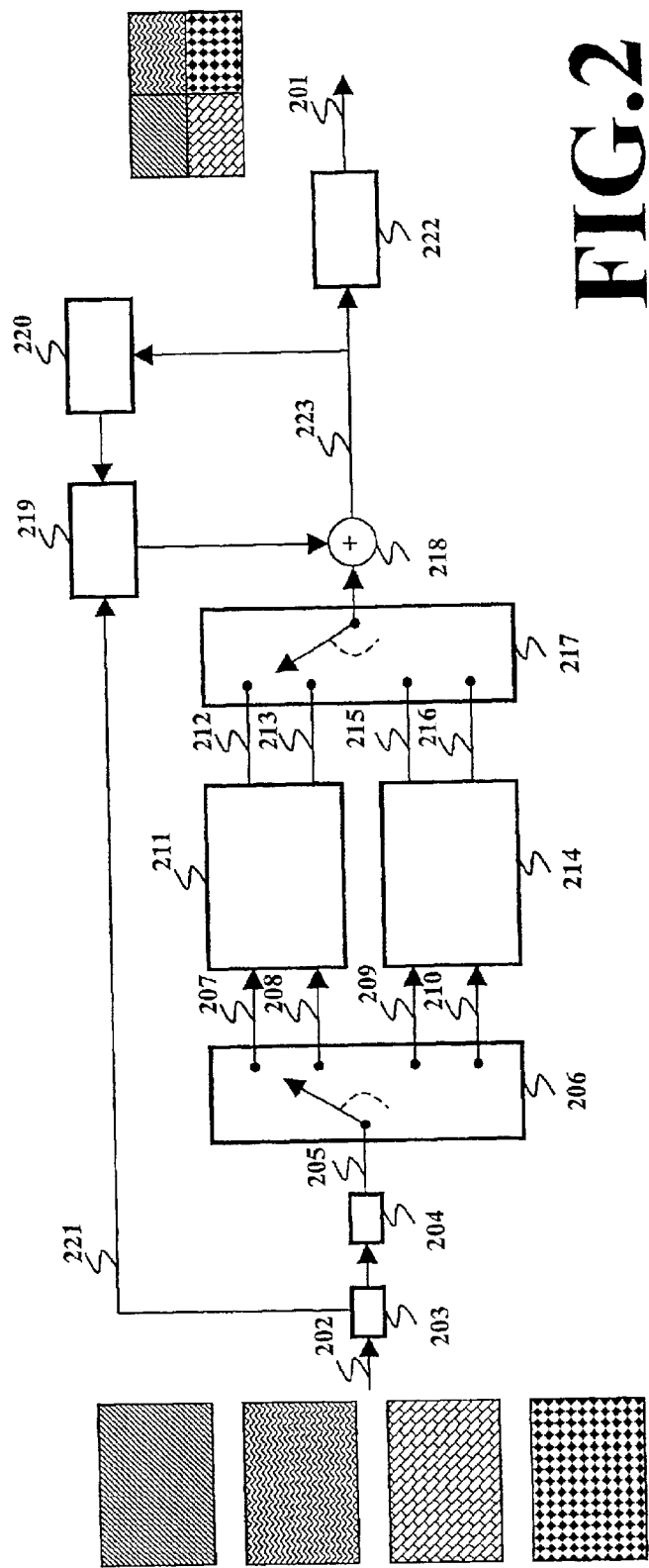

In the drawings:

FIG. 1 illustrates the processing method according to the invention for reducing two encoded video signals by a factor of 2, FIG. 2 describes a system of composing a mosaic signal, using the method according to the invention.

The following explications are given by considering that the video signals processed by means of the method according to the invention are encoded in accordance with the MPEG-2 ISO/IEC 13818-2 standard, but it will be evident to those skilled in the art that the invention may also be carried into effect in the same manner when these video signals are decoded in accordance with other video standards using a DCT block-encoding technique such as the standards H.263, MPEG-1 or MPEG-4.

The MPEG2 ISO/IEC 13818-2 standard is based on the use of the DCT transform applied to blocks of pixels having a size of 8*8. Via a quantizing operation, the DCT transform allows decorrelation of the information in each block of pixels in order to retain only the DCT coefficients having the strongest value (each block of pixels being of the INTRA type, i.e. not resulting in a difference with another block of pixels, or of the INTER type, i.e. resulting in a difference with another block of pixels). This DCT transform results in the generation of DCT blocks having a size of 8*8 comprising 8*8 DCT coefficients.

Inversely, when a video signal is encoded in accordance with the MPEG2 standard, each DCT block having a size of 8*8 is decoded by using an inverse DCT transform in order to generate a block of pixels having a size of 8*8. This inverse transform is governed by the following equation:

$$x(n, m) = \frac{1}{4}\sum_{i=0}^{7}\sum_{j=0}^{7} C(n)C(m)f(n, m)\cos\left(\frac{(2n+1)i\pi}{16}\right)\cos\left(\frac{(2m+1)j\pi}{16}\right) \quad \text{Eq. 1}$$

$$\text{with } C(n), C(m) = \begin{cases} \frac{1}{\sqrt{2}} & \text{if } n = 0, m = 0 \\ 1 & \text{if } n \neq 0 \text{ or } m \neq 0 \end{cases}$$

n: row in a block, m: column in a block, x(n,m): value of the pixel situated at the intersection between the row n and the column m, f(n,m): value of the DCT coefficient situated at the intersection of the row n and the column m.

This inverse DCT transform uses a double indexing of i and j which has the drawback of using considerable computing means. To alleviate this drawback, it is possible to use the property of equation 1 allowing separation of the inverse DCT transform in two distinct successive computations. As soon as each pixel results directly from a linear combination of 8*8=64 values f(n,m), as is the case if equation 1 is directly used, each pixel thus results from two successive linear combinations of 8 values f(n,m). In other terms, an inverse DCT transform as governed by equation 1 may be obtained by means of a first inverse DCT transform on the rows of a DCT block, followed by a second inverse DCT transform on the columns of the block obtained after the first inverse DCT transform. Each inverse DCT transform is governed by the following equation:

$$x(n) = \sum_{i=0}^{7} \cos\left(\frac{(2n+1)i\pi}{16}\right) C(n) y(n) \qquad \text{Eq. 2}$$

$$\text{with } C(n) = \begin{cases} \frac{1}{2\sqrt{2}} & \text{if } n = 0 \\ \frac{1}{2} & \text{if } n \neq 0 \end{cases}$$

n: integer such as $0 \leq n \leq 7$,
x(n): value of the pixel n,
y(n): value of the DCT coefficient n in a row or a column of the DCT block.

The computation of equation 2 is used for the multiplication of a matrix of size 8*8 with a vector composed of 8 DCT coefficients, corresponding to one row or one column of a DCT block to be decoded, said multiplication resulting in a vector composed of 8 values in the pixel domain. However, it is possible to use a matrix $M_{8*8}$ for the purpose of simplifying the computations. For a set of entries based on equation 2, the inverse DCT transform is then governed by the following equations using a pre-multiplication of the DCT coefficients y(n) (cf. equation 3), a matrix computation with the matrix $M_{8*8}$ (cf. equation 4) and a recursive computation allowing determination of the output coefficients x(n) (cf. equation 5):

$$\begin{cases} X(n) = \frac{1}{2\sqrt{2}} y(n) & \text{for } n = 0, 4 \\ X(n) = \frac{1}{2\sqrt{2}} \cos\left(n\frac{\pi}{16}\right) y(n) & \text{for } n = 1, 2, 3, 5, 6, 7 \end{cases} \qquad \text{Eq. 3}$$

$$\begin{pmatrix} x'(0) \\ x'(1) \\ x'(2) \\ x'(3) \\ x'(4) \\ x'(5) \\ x'(6) \\ x'(7) \end{pmatrix} = M_{8 \times 8} \cdot \begin{pmatrix} X(0) \\ X(4) \\ X(1) + X(7) \\ X(2) + X(6) \\ X(3) + X(5) \\ X(1) - X(7) \\ X(2) - X(6) \\ X(3) - X(5) \end{pmatrix} \qquad \text{Eq. 4}$$

$$\text{with } M_{8 \times 8} = \begin{pmatrix} 1 & 1 & A & A & A & 0 & 0 & 0 \\ 1 & 0 & 0 & 0 & 0 & B & 1 & C \\ 1 & -1 & 1 & 0 & -1 & 0 & 0 & 0 \\ 1 & 0 & 0 & 0 & 0 & C & -1 & -B \\ 1 & 1 & 0 & -A & 0 & 0 & 0 & 0 \\ 1 & 0 & 0 & 0 & 0 & -C & -1 & B \\ 1 & -1 & -1 & 0 & 1 & 0 & 0 & 0 \\ 1 & 0 & 0 & 0 & 0 & -B & 1 & -C \end{pmatrix}$$

$$\begin{cases} x(0) = x'(0) \\ x(n) = 2x'(n) - x(n-1) \text{ for } n = 1 \ldots 7 \end{cases} \qquad \text{Eq. 5}$$

$$\text{with } \begin{cases} A = \sqrt{2} \\ B = \sqrt{2} \cos\left(\frac{\pi}{8}\right) \\ C = \sqrt{2} \cos\left(\frac{3\pi}{8}\right) \end{cases}$$

The method according to the invention allows, in one and the same operation, a simultaneous decoding of several DCT input blocks. It is based on a partial processing of the coefficients in each DCT block, said decoding consisting at the same time of a reduction of the size of the blocks and an inverse DCT transform of the coefficients.

The format of the DCT input blocks is reduced by extracting a limited set of DCT coefficients in the rows and columns of each DCT block, the inverse DCT transform being then applied to this limited set of DCT coefficients. Indeed, it is possible to obtain a good image quality of the reduced format by solely decoding a limited set of DCT coefficients, this limited set corresponding to the coefficients of a lower frequency in the DCT blocks of size 8*8. These coefficients are usually situated in the upper left square of each DCT block in so far as the coefficients are classified in increasing frequency, the DC component being situated in the upper left corner.

A reduction of the format by a factor of 2 or 4 of the DCT blocks may be envisaged. In the case of a reduction of the format by a factor of 2, a DCT block having a size of 8*8 will be decoded so that it results in a block of pixels having a size of 4*4. In the case of a reduction of the format by a factor of 4, a DCT block having a size of 8*8 will be decoded so that it results in a block of pixels having a size of 2*2. To this end, the method according to the invention uses a successive inverse DCT transform on the rows and columns of a DCT block comprising said limited set of DCT coefficients.

In the case where a reduction of the format by a factor of 2 is envisaged, the transform applied to a set of 4 DCT coefficients is governed by the following equation:

$$x(n) = \sum_{i=0}^{3} \cos\left(\frac{(2n+1)i\pi}{8}\right) C(n) y(n) \qquad \text{Eq. 6}$$

$$\text{with } C(n) = \begin{cases} \frac{1}{2} & \text{if } n = 0 \\ \frac{1}{\sqrt{2}} & \text{if } n \neq 0 \end{cases}$$

n: integer such as $0 \leq n \leq 3$,
x(n): value of the pixel n,
y(n): value of the DCT coefficient n in a row or column of the DCT block.

The computation of equation 6 is used for multiplication of a matrix of size 4*4 with a vector composed of 4 DCT coefficients, corresponding to one row or one column of a DCT block having a size of 4*4 extracted from a DCT block having a size of 8*8 to be decoded, said multiplication resulting in a vector composed of 4 values in the pixel domain. However, it is possible to use a matrix $M_{4*4}$ for the purpose of simplifying the computations. For a set of entries based on equation 6, the inverse DCT transform is then governed by the following equations using a pre-multiplication of the DCT coefficients y(n) in accordance with equation 7, a matrix computation with the matrix $M_{4*4}$ in accordance with equation 8, and a recursive computation in accordance with equation 9, allowing determination of the output coefficients i.e. the value of the pixels x(k):

$$\begin{cases} X(n) = \frac{1}{2} y(n) & \text{for } n = 0, 2 \\ X(n) = \frac{1}{2} \cos\left(n\frac{\pi}{8}\right) y(n) & \text{for } n = 1, 3 \end{cases} \qquad \text{Eq. 7}$$

$$\begin{pmatrix} x'(0) \\ x'(1) \\ x'(2) \\ x'(3) \end{pmatrix} = M_{4\times 4} \cdot \begin{pmatrix} X(0) \\ X(2) \\ X(1) + X(3) \\ X(1) - X(3) \end{pmatrix} \quad \text{Eq. 8}$$

$$\text{with } M_{4\times 4} = \begin{pmatrix} 1 & 1 & A & 0 \\ 1 & 0 & 0 & 1 \\ 1 & -1 & 0 & 0 \\ 1 & 0 & 0 & -1 \end{pmatrix}$$

$$\begin{cases} x(0) = x'(0) \\ x(k) = 2x'(k) - x(k-1) \quad k = 1 \ldots 3 \end{cases} \quad \text{Eq. 9}$$

$$\text{with } A = \sqrt{2}$$

Equation 4 shows that an inverse DCT transform effected successively on the rows and columns of a DCT block having a size of 8*8 involves the use of an 8*8 transform matrix. The method according to the invention benefits from the fact that an inverse DCT transform of a DCT block having a reduced size uses a transform matrix having a reduced size (such as $M_{2*2}$ or $M_{4*4}$) similarly as it is possible to define an inverse DCT transform matrix having a size of 8*8, i.e. a matrix of the standard size used for an inverse DCT transform of an 8*8 DCT block comprising several transform matrices of a reduced size for simultaneously decoding several DCT blocks in a single matrix computation applied successively to a limited set of DCT coefficients extracted from the rows and columns of said DCT blocks.

FIG. 1 shows the case where two decoded video signals having a reduced format are obtained from two video signals encoded in accordance with the MPEG2 standard. Two DCT blocks 101 and 102 having a size of 8*8 each associated with an encoded video signal are subjected to a simultaneous processing operation performed successively on their rows and subsequently on their columns, leading to a reduction of their format as well as to an inverse DCT transform. The block of pixels 103 can be obtained by decoding the DCT block 101, while the block of pixels 104 can be obtained with the DCT block 102. This decoding operation is performed for all the DCT blocks of the encoded video signals.

This method comprises a matrix computation step using a transform matrix $M_{2*4*4}$ of size 8*8 whose coefficients are derived from the matrix $M_{4*4}$. The matrix $M_{2*4*4}$ is defined by:

$$M_{2\times 4\times 4} = \begin{pmatrix} M_{4\times 4} & 0 \\ 0 & M_{4\times 4} \end{pmatrix} = \begin{pmatrix} 1 & 1 & A & 0 & 0 & 0 & 0 & 0 \\ 1 & 0 & 0 & 1 & 0 & 0 & 0 & 0 \\ 1 & -1 & 0 & 0 & 0 & 0 & 0 & 0 \\ 1 & 0 & 0 & -1 & 0 & 0 & 0 & 0 \\ 0 & 0 & 0 & 0 & 1 & 1 & A & 0 \\ 0 & 0 & 0 & 0 & 1 & 0 & 0 & 1 \\ 0 & 0 & 0 & 0 & 1 & -1 & 0 & 0 \\ 0 & 0 & 0 & 0 & 1 & 0 & 0 & -1 \end{pmatrix}$$

In this way, it is possible to perform a double decoding operation on the DCT blocks 101 and 102 in a simultaneous manner by means of a single matrix computation governed by the following equations:

$$\begin{cases} X(n) = \frac{1}{2} y(n) & \text{for } n = 0, 2, 4, 6 \\ X(n) = \frac{1}{2} \cos\left(n\frac{\pi}{8}\right) y(n) & \text{for } n = 1, 3, 5, 7 \end{cases} \quad \text{Eq. 10}$$

$$\begin{pmatrix} x'(0) \\ x'(1) \\ x'(2) \\ x'(3) \\ x'(4) \\ x'(5) \\ x'(6) \\ x'(7) \end{pmatrix} = M_{2\times 4\times 4} \cdot V_{2\times 4\times 4} \quad \text{with } V_{2\times 4\times 4} = \begin{pmatrix} X(0) \\ X(4) \\ X(1) + X(7) \\ X(2) + X(6) \\ X(3) + X(5) \\ X(1) - X(7) \\ X(2) - X(6) \\ X(3) - X(5) \end{pmatrix} \quad \text{Eq. 11}$$

$$\begin{cases} x(0) = x'(0) \\ x(k) = 2x'(k) - x(k-1) \quad k = 1 \ldots 3 \\ x(4) = x'(4) \\ x(k) = 2x'(k) - x(k-1) \quad k = 5 \ldots 7 \end{cases} \quad \text{Eq. 12}$$

This system of equations is first applied on the rows of blocks having a size of 4*4, referenced B1 and B2, B1 and B2 being extractions of the DCT blocks of the size 8*8 referenced 101 and 102. The blocks B1 and B2 advantageously comprise the DCT coefficients having the lower frequency of the DCT blocks referenced 101 and 102.

In this computation, the coefficients y(n) are extracted from the blocks B1 and B2 so as to define the 8 values X(n), the values X(n) allowing computation of the components of the row vector $V_{2*4*4}$ of size 8 to which the transform matrix $M_{2*4*4}$ applies.

After matrix computation in accordance with equation 11 for obtaining the column vector composed of 8 values x'(n), the resolution of the recursive computation in accordance with equation 12 allows an output vector of size 8 to be obtained, comprising the values x(n), the 4 first values [x(0), x(1), x(2), x(3)] and the 4 last values [x(4), x(5), x(6), x(7)] corresponding to the first row of the blocks 105 and 106, respectively, referred to as "intermediate blocks".

The same operation performed on the row of coefficients [y(0), y(1), y(2), y(3)] is repeated for the 3 other lines of the blocks B1 and B2 from which each time the 4 first coefficients y(n) are extracted. In this way, the two intermediate blocks of size 4*4 referenced 105 and 106 are entirely defined.

Secondly, for obtaining the output blocks 103 and 104, the system of equations 10, 11 and 12 is used for values $y(n)=y_{col}(n)$ in the four columns of the intermediate blocks 105 and 106 as illustrated in FIG. 1. This means that the operation performed on the four rows of the blocks B1 and B2 is performed once more, but this time it is performed for the blocks of size 4*4 obtained after transposition of the blocks 105 and 106.

For the operation performed on the DCT blocks referenced B1 and B2 it is of course possible to perform an operation in accordance with equations 10-11-12 first on the columns of the blocks B1 and B2 and then on the rows of the intermediate blocks 105 and 106 for the purpose of defining the output blocks of size 4*4, referenced 103 and 104.

Similarly as in equations 4 and 8, in the case where a reduction of the format by a factor of 4 is envisaged, it is possible to define a transform matrix $M_{2*2}$ of size 2*2 allowing an inverse DCT transform of a set of 2 DCT coefficients of a row or a column of a DCT block having a size of 2*2, the latter being extracted from a DCT block having a size of 8*8. In this case, it is possible to decode 4

DCT blocks of size 8*8 according to the invention, each DCT block being transformed into a block of pixels having a size of 2*2. To this end, an approach identical to that relating to equations 10, 11 and 12 is conducted by way of a matrix computation in accordance with equations 13, 14 and 15 by means of a matrix $M_{4*4*4}$ having a size of 8*8, defined by:

$$M_{4 \times 4 \times 4} = \begin{pmatrix} M_{2 \times 2} & 0 & 0 & 0 \\ 0 & M_{2 \times 2} & 0 & 0 \\ 0 & 0 & M_{2 \times 2} & 0 \\ 0 & 0 & 0 & M_{2 \times 2} \end{pmatrix} \cdot \begin{pmatrix} 1 & 1 & 0 & 0 & 0 & 0 & 0 & 0 \\ 1 & 0 & 0 & 0 & 0 & 0 & 0 & 0 \\ 0 & 0 & 1 & 1 & 0 & 0 & 0 & 0 \\ 0 & 0 & 1 & 0 & 0 & 0 & 0 & 0 \\ 0 & 0 & 0 & 0 & 1 & 1 & 0 & 0 \\ 0 & 0 & 0 & 0 & 1 & 0 & 0 & 0 \\ 0 & 0 & 0 & 0 & 0 & 0 & 1 & 1 \\ 0 & 0 & 0 & 0 & 0 & 0 & 1 & 0 \end{pmatrix}$$

with $M_{2 \times 2} = \begin{pmatrix} 1 & 1 \\ 1 & 0 \end{pmatrix}$ $$\left\{ X(n) = \frac{1}{\sqrt{2}} y(n) \text{ for } n = 0 \ldots 7 \right. \qquad \text{Eq. 13}$$

$$\begin{pmatrix} x'(0) \\ x'(1) \\ x'(2) \\ x'(3) \\ x'(4) \\ x'(5) \\ x'(6) \\ x'(7) \end{pmatrix} = M_{4 \times 4 \times 4} \cdot V_{4 \times 4 \times 4} = M_{4 \times 4 \times 4} \cdot \begin{pmatrix} X(0) \\ X(1) \\ X(2) \\ X(3) \\ X(4) \\ X(5) \\ X(6) \\ X(7) \end{pmatrix} \qquad \text{Eq. 14}$$

$$\begin{cases} x(0) = x'(0) \\ x(k) = 2x'(k) - x(k-1) & k = 1 \\ x(2) = x'(2) \\ x(k) = 2x'(k) - x(k-1) & k = 3 \\ x(4) = x'(4) \\ x(k) = 2x'(k) - x(k-1) & k = 5 \\ x(6) = x'(6) \\ x(k) = 2x'(k) - x(k-1) & k = 7 \end{cases} \qquad \text{Eq. 15}$$

A remarkable aspect of this invention is that it is possible to perform different types of decoding operations on DCT blocks of size 8*8 by means of a matrix computation using a matrix of the same size 8*8:
a first matrix computation using the matrix $M_{8*8}$ followed by a recursive computation allowing decoding of all the coefficients of a DCT input block of size 8*8 of a single encoded video signal so that it results in a block of pixels having a size of 8*8,
a second matrix computation using the matrix $M_{2*4*4}$ of size 8*8 allowing decoding, in the same matrix operation followed by a recursive computation, two DCT input blocks of size 8*8 from two encoded video signals so that it results in two blocks of pixels having a size of 4*4,
a third matrix computation using the matrix $M_{4*4*4}$ of size 8*8 allowing decoding, in the same matrix operation followed by a recursive computation, four DCT input blocks of size 8*8 from four encoded video signals so that it results in four blocks of pixels having a size of 2*2.
This decoding method thus allows passing from one reduction factor to another by simply changing the coefficients of a computation matrix of size 8*8 in accordance with the number of video signals to be decoded simultaneously.

FIG. 2 describes a system of creating a mosaic signal, implementing the decoding method according to the invention. This system illustrates the means for creation by a service provider of a mosaic video signal 201 from a set of multiplexed video signals 202.

This system allows generation of a mosaic signal 201 after processing four multiplexed video input signals 202. These video signals correspond to video signals which are compressed, for example, in accordance with the MPEG2 standard and multiplexed in an MPEG2 transport stream.

Each video input signal is subjected to a reduction of the format by a factor of 2 horizontally and vertically, the signals being processed two by two in the method according to the invention via the matrix computation using the matrix $M_{2*4*4}$.

The DCT coefficients in the signals 202 are first subjected to an entropy decoding by means 203 (for example, a correspondence table conforming each coefficient of the signal with a new output coefficient), subsequently an inverse quantizing operation by the means 204 (for example, the computation means performing a multiplication of the input coefficients by a coefficient), said means 204 supplying a signal 205 comprising DCT coefficients which characterize each compressed video input signal. In order to reduce the complexity of the implementation, the operations 203 and 204 may be temporally multiplexed so that these operations are successively performed on the DCT coefficients in each of the four video input signals.

A demultiplexer 206 allows separation of the DCT coefficients in the signal 205 for grouping the DCT coefficients related to 8*8 DCT blocks 207 defining a first encoded video signal, the DCT coefficients related to 8*8 DCT blocks 208 defining a second encoded video signal, the DCT coefficients related to 8*8 DCT blocks 209 defining a third encoded video signal, and the DCT coefficients related to 8*8 DCT blocks 210 defining a fourth encoded video signal.

The 8*8 DCT blocks 207 and 208 are then simultaneously decoded with the means 211 in the different steps of the method described with reference to FIG. 1 so as to supply the blocks of pixels 212 and 213 of size 4*4, respectively. The means 211 notably comprise hardware matrix computation means (for example, of the signal processor type) and/or software (set of instructions, program codes from the compilation of a computer program), said computation means being temporally sequenced by a state machine for performing a series of inverse DCT operations on vectors with a dimension having 8 coefficients extracted from the rows of the blocks 207 and 208, and a buffer memory for storing the result of these inverse DCT transforms. Said matrix computation means subsequently perform a second series of inverse DCT operations in accordance with the columns on the coefficients stored in said buffer memory. In the same matrix multiplication performed between a 8*8 matrix (here the matrix $M_{2*4*4}$) and a vector of dimension 8, the means 211 allow decoding of the DCT blocks 207 and 208 so that an inverse DCT transform is performed at the same time as a reduction of the format by a factor of 2.

In a manner similar to DCT blocks 207 and 208, the DCT blocks 209 and 210 are decoded in accordance with the method described with reference to FIG. 1 by the means 214 (identical to the means 211), resulting in the pixel blocks 215 and 216 of size 4*4, respectively.

As the video input signals are encoded in accordance with the MPEG2 standard, the DCT blocks 207, 208, 209 and 210 may thus be either of the INTRA type, for which no motion compensation is necessary, or of the INTER type for which a motion compensation must be performed in order to prevent drift of image quality in the course of time.

In order to reduce the complexity of the implementation, a single motion compensation loop formed by the elements 218, 219 and 220 is provided. The multiplexer 217 allows successive processing as a function of time of the different pixel blocks of size 4*4, denoted by the reference numerals 212, 213, 215 and 216.

When a 4*4 pixel block is of the INTRA type, no motion compensation is performed so that the block of pixels based on the signal 223 is identical to block 212.

When a 4*4 block of pixels is of the INTER type, an addition by means of the adder 218 is performed between the pixels of this block and those of a reference block of the same dimension previously stored in the memory 220 and motion-compensated by means of the motion compensator 219, said compensator using the motion vectors 221 in the scale and associated with said block of the INTER type (here by way of a reduction by a factor of 2 of each horizontal and vertical component).

Independent of the fact whether the 4*4 block of pixels supplied by the multiplexer 217 is of the INTRA or the INTER type, a decoded 4*4 block of pixels is obtained on the signal 223.

Lastly, a video composer 222 assembles, in the same image plane, the different blocks based on the signal 223. In this way, the reduction of the format by a factor of 2 (horizontally and vertically) performed on the video input signals, 4 video signals having a reduced format are assembled in the same image plane, resulting in the mosaic video signal 201 intended, for example, for display on a television screen.

The method according to the invention, used in the system illustrated with reference to FIG. 2, is characterized in that a simple change of the coefficients in the 8*8 matrix used for performing the inverse DCT transforms allows passing, without changing the material architecture of the means 211 and 214, from the creation of a mosaic signal 201 comprising four video signals having a size reduced by a factor of 2 to the decoding of a single video input signal without format reduction. This characteristic feature is particularly useful when a user selects a signal of the reduced format in the mosaic signal for the purpose of visualizing this selected signal on the full screen. Indeed, in the case where a mosaic signal 201 is generated, the matrix $M_{2*4*4}$ is used for the matrix computation related to inverse DCT transforms performed by 211 and 214. It is thus sufficient to replace the 8*8 matrix $M_{2*4*4}$ by the 8*8 matrix $M_{8*8}$ and subsequently apply the latter to the DCT blocks of a single input signal selected from 207-208-209-201, resulting in the generation of the selected video signal without format reduction.

The invention also provides a second system (not shown) of the type shown in FIG. 2 for creating a mosaic signal from 16 video input signals. In this case, 4 DCT blocks of size 2*2, each associated with an encoded video input signal are simultaneously decoded by means of the same matrix operation using the matrix $M_{4*4*4}$. Each 8*8 DCT block is thus transformed into a 2*2 block of pixels, which, after composition, allows creation of a mosaic signal comprising 16 reduced format video signals.

More generally, the invention relates to a system of creating a mosaic signal from a set of $2^N$ encoded video input signals by performing a reduction of the format by a factor N of the encoded input signals by means of the method described above. To this end, it is necessary to apply said method for each sub-set of $(2^N/N)$ encoded video input signals.

In this system of creating a mosaic signal, a change of the coefficients of the transform matrix can be advantageously effected during inverse DCT transform for the purpose of generating:

either a single video signal of a non-reduced format via the matrix $M_{8*8}$ by applying the method according to the invention on a single one of the $2^N/N$ signals, or 4 video signals of a format reduced by a factor of 2 via the matrix $M_{2*4*4}$, by applying the method according to the invention on 2 sets of 2 signals from the $2^N/N$ signals, or 16 video signals of a format reduced by a factor of 4 via the matrix $M_{4*4*4}$, by applying the method according to the invention on 4 sets of 4 signals from the $2^N/N$ signals.

Advantageously, the method according to the invention may also be used for reducing the format by a factor N of one and the same encoded video input signal by applying the processing operations described above to 8*8 DCT blocks based on the same encoded video signal.

A processing method according to the invention may be advantageously used in a video processing system for reducing the format of one or several encoded video signals, or in a system for creating a mosaic signal. Particularly, such systems may be implemented and used in service provider equipment or TV broadcast systems.

As for carrying out the invention, it will particularly use computer programs comprising program code instructions for executing the different steps of the method when said programs are performed on signal processors.

What is claimed is:

1. A method of video processing N encoded video input signals for decoding and reducing the format of each encoded video input signal by a factor N and generating a set of decoded video signals of a reduced format in the pixel domain, each encoded video input signal comprising DCT blocks having a size of 8*8, referred to as "DCT input blocks", characterized in that said video processing method comprises the steps of:

extracting N blocks having a reduced size (8/N*8/N), each block having a reduced size being extracted from a DCT input block, a first inverse DCT transform applied successively to input vectors having a size of 8, each input vector being replaced by coefficients of rows (or columns) constituting the N blocks having a reduced size, each inverse DCT transform step generating an output vector having a size of 8 defining the rows (or the columns) of the N intermediate blocks having a reduced size, said first inverse DCT transform step being repeated for all the rows (or the columns) of the N reduced-size blocks, a second inverse DCT transform applied successively to input vectors having a size of 8, each input vector being replaced by coefficients of columns (or rows) constituting the N intermediate blocks, each inverse DCT transform step generating an output vector having a size of 8 defining, via a recursive computing step applied to the values of said output vector, the columns (or the rows) of N output blocks having a reduced size, said second inverse DCT transform step being repeated for all the columns (or the rows) of the N intermediate blocks, each of said N reduced-size output blocks defining one of said decoded video signals having a format reduced by a factor N.

2. A video processing method as claimed in claim 1, characterized in that the extraction step effects the extraction of DCT coefficients of a lower frequency in each DCT input block.

3. A video processing method as claimed in claim 2, characterized in that the first and the second inverse DCT transform step use a transform matrix having a size of 8*8 whose coefficient value is a function of the value of the parameter N.

4. A video processing method for decoding and reducing the format of an encoded video input signal by a factor N and for generating a decoded video signal of the reduced format in the pixel domain, said encoded video input signal comprising DCT blocks having a size of 8*8, referred to as "DCT input blocks", said video processing method being characterized in that it comprises the steps of:

extracting N blocks having a reduced size (8/N*8/N), each block having a reduced size being extracted from a DCT input block, a first inverse DCT transform applied successively to input vectors having a size of 8, each input vector being replaced by coefficients of rows (or columns) constituting the N blocks having a reduced size, each inverse DCT transform step generating an output vector having a size of 8 defining the rows (or the columns) of the N intermediate blocks having a reduced size, said first inverse DCT transform step being repeated for all the rows (or the columns) of the N reduced-size blocks, a second inverse DCT transform applied successively to input vectors having a size of 8, each input vector being replaced by coefficients of columns (or rows) constituting the N intermediate blocks, each inverse DCT transform step generating an output vector having a size of 8 defining, via a recursive computing step applied to the values of said output vector, the columns (or the rows) of N output blocks having a reduced size, said second inverse DCT transform step being repeated for all the columns (or the rows) of the N intermediate blocks, said output blocks having a reduced size defining said decoded video signal having a format reduced by a factor N.

5. A method of creating a program mosaic from a set of $2^N$ encoded video input signals comprising DCT blocks having a size of 8*8, referred to as "DCT input blocks", said mosaic consisting of a juxtaposition of decoded video programs having a format reduced by a factor N, obtained from said encoded video input signals, said method of creating being characterized in that it comprises, for each sub-set of $(2^N/N)$ encoded video input signals, the steps of extracting N blocks having a reduced size (8/N*8/N), each block having a reduced size being extracted from a DCT input block associated with the sub-set under consideration, a first inverse DCT transform applied successively to input vectors having a size of 8, each input vector being replaced by coefficients of rows (or columns) constituting the N blocks having a reduced size, each inverse DCT transform step generating an output vector having a size of 8 defining the rows (or the columns) of the N intermediate blocks having a reduced size, said first inverse DCT transform step being repeated for all the rows (or the columns) of the N reduced-size blocks, a second inverse DCT transform applied successively to input vectors having a size of 8, each input vector being replaced by coefficients of columns (or rows) constituting the N intermediate blocks, each inverse DCT transform step generating an output vector having a size of 8 defining, via a recursive computing step applied to the values of said output vector, the columns (or the rows) of N output blocks having a reduced size, said second inverse DCT transform step being repeated for all the columns (or the rows) of the N intermediate blocks, in each sub-set, each of said N output blocks having a reduced size defining one of said decoded video signals having a format reduced by a factor N.

6. A method of creating a program mosaic as claimed in claim 5, characterized in that the extraction step effects the extraction of DCT coefficients of a lower frequency in each DCT input block.

7. A method of creating a program mosaic as claimed in claim 6, characterized in that the first and the second inverse DCT transform step use a transform matrix having a size of 8*8 whose coefficient value is a function of the value of the parameter N.

8. A system of video processing N encoded video input signals, characterized in that it uses a method as claimed in claim 1.

9. A system of video processing an encoded video input signal, characterized in that it uses a method as claimed in claim 4.

10. A system of creating a program mosaic from a set of $2^N$ encoded video input signals, characterized in that it uses a method as claimed in claim 5.

11. A computer program comprising program code instructions for executing the different steps of the method as claimed in claim 1, when said program is performed on a signal processor in a video processing system.

12. A computer program comprising program code instructions for executing the different steps of the method as claimed in claim 5, when said program is performed on a signal processor in a system for creating a program mosaic.

* * * * *